United States Patent
Kim (10) Patent No.: US 9,517,792 B2
(45) Date of Patent: Dec. 13, 2016

(54) CLEARANCE COMPENSATOR OF YOKE

(71) Applicant: HYUNDAI MOBIS CO., LTD., Seoul (KR)

(72) Inventor: Tae Yoon Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/682,027

(22) Filed: Apr. 8, 2015

(65) Prior Publication Data

US 2015/0307122 A1  Oct. 29, 2015

(30) Foreign Application Priority Data

Apr. 29, 2014  (KR) .................. 10-2014-0051702

(51) Int. Cl.
| | | |
|---|---|---|
| *F16H 55/18* | (2006.01) | |
| *F16H 35/00* | (2006.01) | |
| *B62D 3/12* | (2006.01) | |
| *F16H 55/28* | (2006.01) | |
| *F16H 57/12* | (2006.01) | |

(52) U.S. Cl.
CPC ............. *B62D 3/123* (2013.01); *F16H 55/283* (2013.01); *F16H 57/12* (2013.01); *F16H 2055/281* (2013.01); *F16H 2057/127* (2013.01)

(58) Field of Classification Search
CPC ........ B62D 3/123; F16H 55/283; F16H 57/12; F16H 2055/281; F16H 2057/127
See application file for complete search history.

(56) References Cited

U.S. PATENT DOCUMENTS

| | | | | |
|---|---|---|---|---|
| 5,746,285 A * | 5/1998 | Yonezawa | ............... | B62D 3/123 180/428 |
| 6,142,031 A * | 11/2000 | Phillips | .................. | B62D 3/123 384/37 |
| 6,357,314 B1* | 3/2002 | Sommer | ................ | B62D 3/123 180/427 |
| 7,487,984 B1* | 2/2009 | Lemont, Jr. | ............ | B62D 3/123 280/93.514 |
| 7,930,951 B2* | 4/2011 | Eickholt | ................ | B62D 3/123 74/388 PS |
| 2008/0034911 A1* | 2/2008 | Bieber | ................... | B62D 3/123 74/422 |

(Continued)

FOREIGN PATENT DOCUMENTS

| | | |
|---|---|---|
| JP | 62-29973 U | 2/1987 |
| JP | 2013-525186 A | 6/2013 |

(Continued)

OTHER PUBLICATIONS

Office Action dated Mar. 8, 2016 of corresponding Japanese Patent Application No. 2015-082000—4 pages.

*Primary Examiner* — William Kelleher
*Assistant Examiner* — Jake Cook
(74) *Attorney, Agent, or Firm* — Knobbe Martens Olson & Bear LLP (57) ABSTRACT

A yoke clearance compensator is disclosed. It includes a yoke body installed in a housing of a steering gear box to support a rack bar; an elastic member to press the yoke body toward the rack bar; a press portion contacted with the elastic member to support the elastic member; and a yoke plug portion fixed to the housing to adjust the strength of supporting the elastic member by the press portion.

10 Claims, 10 Drawing Sheets

(56) References Cited

U.S. PATENT DOCUMENTS

2010/0018337 A1\* 1/2010 Kawakubo ............. B62D 3/123
  74/422
2013/0091979 A1\* 4/2013 Bareis .................... B62D 3/123
  74/568 R

FOREIGN PATENT DOCUMENTS

| JP | 2014-015986 A | 1/2014 |
| JP | 2014-020452 A | 2/2014 |
| KR | 10-0562579 B1 | 3/2006 |

\* cited by examiner

CLEARANCE COMPENSATOR OF YOKE

CROSS-REFERENCE TO RELATED APPLICATION

The present application claims priority under 35 U.S.C. §119(a) to Korean Patent Application No. 10-2014-0051702, filed on Apr. 29, 2014, in the Korean Intellectual Property Office, which is incorporated herein by reference in its entirety.

BACKGROUND

1. Technical Field

Embodiments relate to a yoke clearance compensator, and more particularly, to a yoke clearance compensator to decrease a noise of a gear box and to maintain a steering feeling.

2. Related Art

Generally, a steering gear box of a rack and pinion type utilizes a yoke system to support a rack bar for the elimination of a clearance between gears, the running stability and the noise reduction of a vehicle.

The background technology is disclosed in Korean Patent No. 10-0562579 (published on Mar. 22, 2006; title of invention: a structure for protecting rattle noise of an auto steering system).

SUMMARY

Various embodiments are directed to a yoke clearance compensator which is devised to solve the above mentioned problems. One aspect provides a yoke clearance compensator to compensate the generation of a clearance between a yoke body and a yoke plug.

Another aspect provides a yoke clearance compensator to prevent the generation of a mechanical crashing sound, to maintain a sliding force of a steering gear box, and to maintain a driving performance of a vehicle.

Another aspect provides a yoke clearance compensator to easily adjust the torsion value of a torsion spring after installation.

In an embodiment, a yoke clearance compensator may include: a yoke body installed in a housing of a steering gear box to support a rack bar; an elastic member to press the yoke body toward the rack bar; a press portion contacted with the elastic member to support the elastic member; and a yoke plug portion including a yoke plug fixed in the housing, and a press adjustment portion engaged by fitting to the yoke plug to adjust the level of support of the press portion to the elastic member.

In an embodiment, the elastic member may be a plate spring.

In an embodiment, the elastic member may be inserted into the inside of the yoke body.

In an embodiment, the press portion may include: a pusher which is rotatably combined to the yoke plug, formed convex toward the elastic member, contacted with the elastic member and supports the elastic member; a rotatable elastic portion whose both ends are fixed with the pusher and the yoke plug portion, respectively, and which provides a rotatable and elastic support to the pusher.

In an embodiment, the pusher may include a pusher plate wherein the rotatable elastic portion is fixed in one side of the pusher plate; and a pusher projection portion which is protruded on the other side of the pusher plate and contacted with the elastic member.

In an embodiment, the pusher projection portion may be formed wherein the surface contacting the elastic member is curved.

In an embodiment, the pusher may further include a pusher fixing portion which is protruded on one side of the pusher plate; on the outer circumference surface of which screw threads are formed; and which is rotatably combined to the yoke plug.

In an embodiment, the pusher plate, the pusher projection portion and the pusher fixing portion may be formed integrally.

In an embodiment, the press adjustment portion may include an adjustment body portion which is engaged to the yoke plug by fitting, and a rotatable elastic fixing portion which is protruded toward the rack bar so that the rotatable elastic portion is fixed.

In an embodiment, the adjustment body portion may include a body of adjustment portion which is rotatably inserted into the yoke plug, and a fitting engagement portion which is located in the rear side of the body of adjustment portion, whose diameter is decreased toward the rack bar, and which is engaged to the yoke plug by fitting.

In an embodiment, the press adjustment portion may further include a body fixing portion which fixes the adjustment body portion to the yoke plug.

In an embodiment, the body fixing portion is entered into a body fixing entering hole portion which is formed in the yoke plug, and fixed to the yoke plug by pressing the adjustment body portion.

In an embodiment, the body fixing portion is formed including a metal material and a shape of a pin.

In an embodiment, a yoke clearance compensator may further include a fixing portion which penetrates the yoke plug, which is settled on the pusher, and which maintains a screw coupling between the pusher and the yoke plug.

In an embodiment, the front end portion of the fixing portion penetrates the yoke plug and is settled on the pusher, and the tail end portion of the fixing portion is protruded outside of the yoke plug.

In an embodiment of a yoke clearance compensator, a press portion is provided between a yoke body and a yoke plug, the press portion is screwed and coupled to the yoke plug and supports the yoke body by pressing, and therefore a contact between a yoke plug and a press portion may be maintained and a clearance due to the movement of a yoke body may be compensated.

In an embodiment, an elastic member is formed as a plate shape and inserted into a yoke body, therefore it may be prevented that the elastic member is located eccentrically to one side.

In an embodiment, a pusher projection portion is formed convex toward the elastic member, the contacting surface with the elastic member is curved, and therefore a friction with the elastic member may be reduced when a pusher plate rotates.

In an embodiment, a press portion include a pusher and a torsion spring, the pusher may continuously support the pusher body by pressing due to a rotational elastic force provided from a torsion spring.

In an embodiment, a fixing portion is provided to maintain a screw coupling between a press portion and a yoke plug, and therefore it may be prevented that a screw coupling is loosened when the press portion and the yoke plug are assembled.

In an embodiment, a rotational elastic portion may be rotated by a press adjustment portion, and therefore the level of compensating the yoke clearance may be adjusted by a simple manipulation without disassembling the equipment.

In an embodiment, an adjustment body portion may be coupled to a yoke plug by fitting, and therefore the adjustment body portion may be simply assembled without a complicated assembling structure.

In an embodiment, a adjustment body portion combined to a yoke plug is fixed to a yoke plug by using a body fixing portion, and therefore it may be prevented that the adjustment body portion is detached from the yoke plug.

DETAILED DESCRIPTION

Hereinafter, embodiments will be described below with reference to the accompanying drawings through various examples.

While various embodiments have been described above, it will be understood to those skilled in the art that the embodiments described are by way of example only. Accordingly, the device or equipment described herein should not be limited based on the described embodiments.

Figure 1:
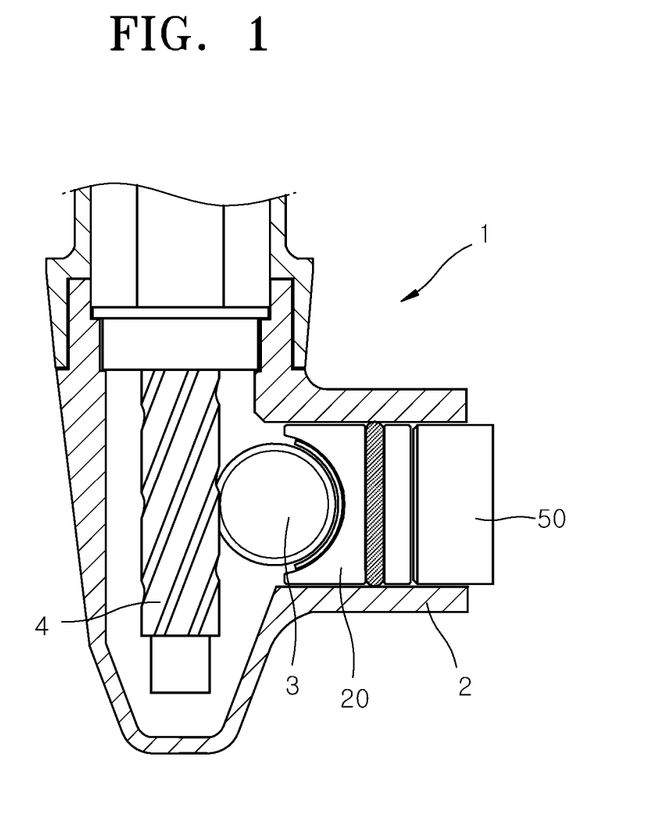
FIG. 1 is a cross sectional view of a steering gear box of a general vehicle.
Figure 2:
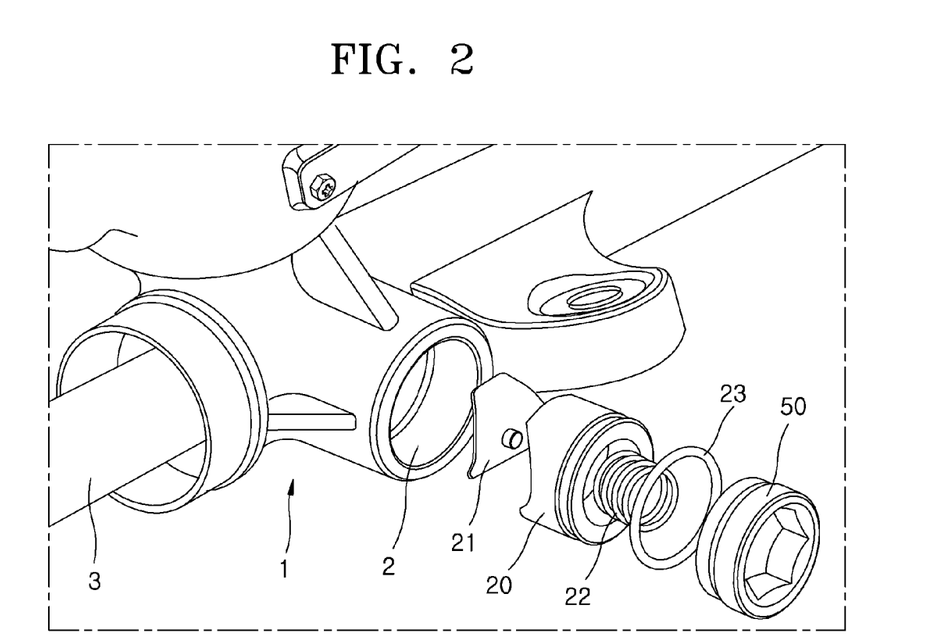
FIG. 2 is a cross sectional view that a yoke equipment for a general type of a steering gear box is installed.
Figure 3:
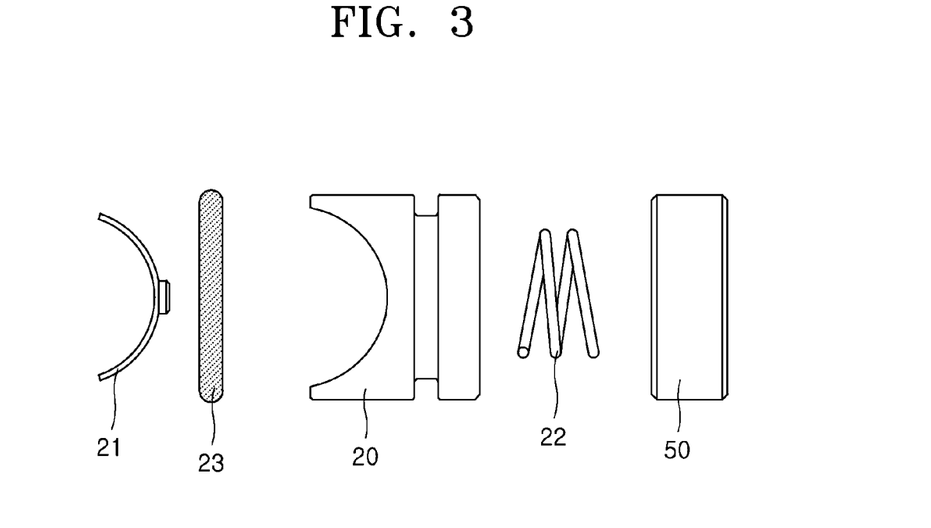
FIG. 3 is a disassembled yoke equipment of a general type vehicle.
Figure 4:
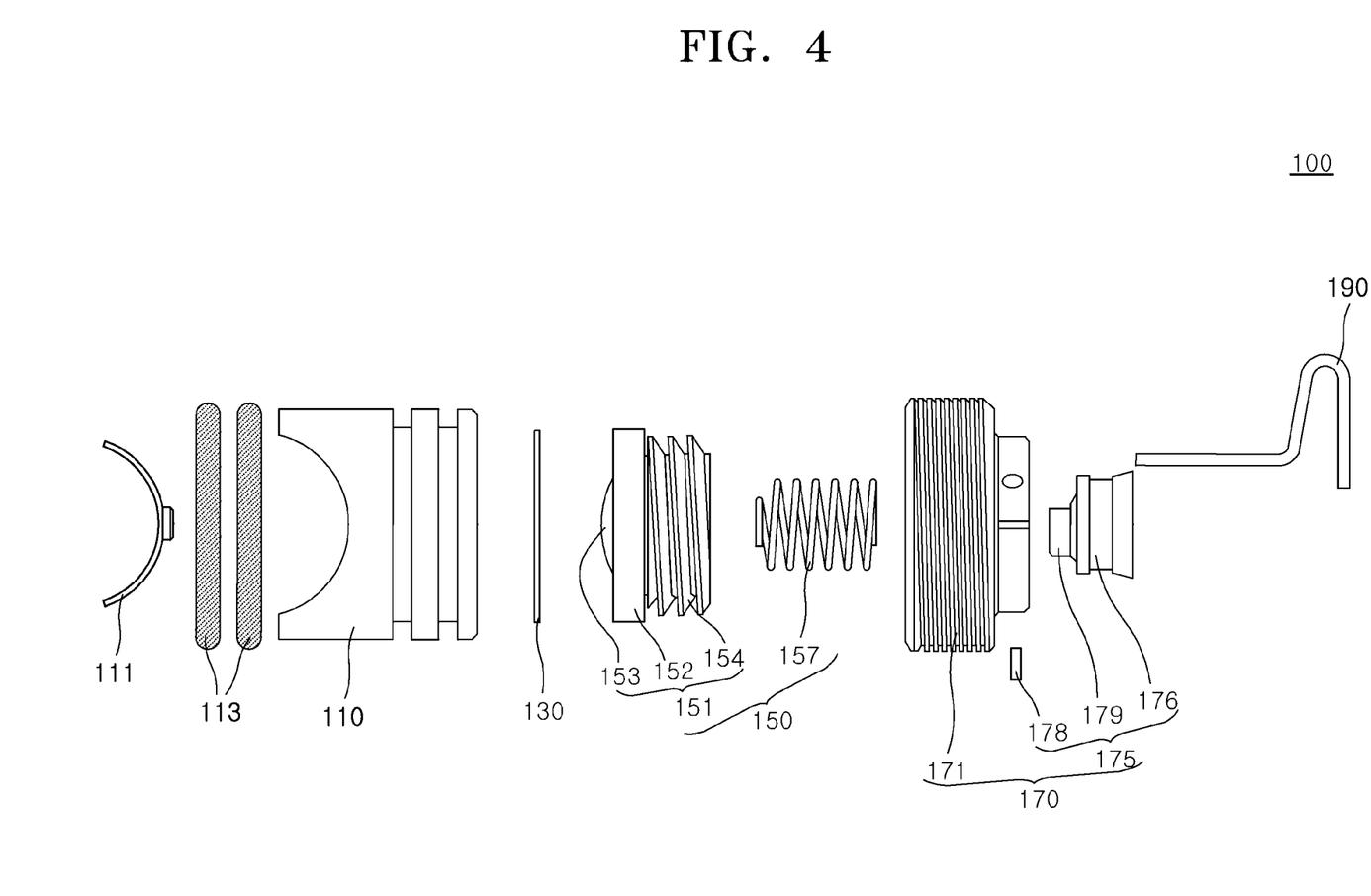
FIG. 4 is a disassembled yoke clearance compensator according to an embodiment.

FIG. 1 is a cross sectional view of a steering gear box of a general vehicle, FIG. 2 is a cross sectional view that a yoke equipment for a general type of a steering gear box is installed, FIG. 3 is a disassembled yoke equipment of a general type vehicle, and FIG. 4 is a disassembled yoke clearance compensator according to an embodiment.

Referring to FIGS. 1 to 3, in a yoke equipment applied to a steering gear box 1, a clearance is generated in a structure that a pinion 4 and a rack bar 3 are engaged by a gear, and therefore a yoke equipment adjusts the clearance between the pinion 4 and the rack bar 3.

In this type of a yoke equipment, a yoke slipper 21, a yoke body 20 combined with a yoke ring 23, a yoke spring 22 and a yoke plug 50 are successively combined to a housing 2 of a steering gear box 1, and the yoke equipment supports a rack bar 3.

In a typical yoke equipment of a steering gear box, a clearance between a yoke body and a yoke plug is increased by the abrasion of a gear and others according to the duration. If a clearance between a yoke body and a yoke plug exceeds a normal level, a yoke body and a yoke plug are collided when an impact from a road surface is delivered to the yoke equipment, a mechanical crashing sound is generated, a driving performance of a vehicle is decreased due to the decrease of the sliding force of a steering gear box.

Referring to FIGS. 1 to 4, a yoke clearance compensator 100 according to an embodiment includes a yoke body 110, an elastic member 130, a press portion 150 and a yoke plug portion 170.

A yoke body 110 is installed on a housing 2 of a steering gear box 1. In this embodiment, a yoke body 110 is a shape of a cylinder so that it is entered into a housing 2 and supports a rack bar 3. The side of the yoke body toward a rack bar 3 is formed concaved.

A yoke slipper 111 is installed on the concaved portion of the yoke body 110, and the yoke body 110 contacts a rack bar 3 through the yoke slipper 111.

In the gap between a housing 2 and a yoke body 110, more than one yoke ring 113 may be coupled to the outer surface of the yoke body 110 by fitting to prevent the rattle of the yoke body 110 due to the tilting.

Figure 5:
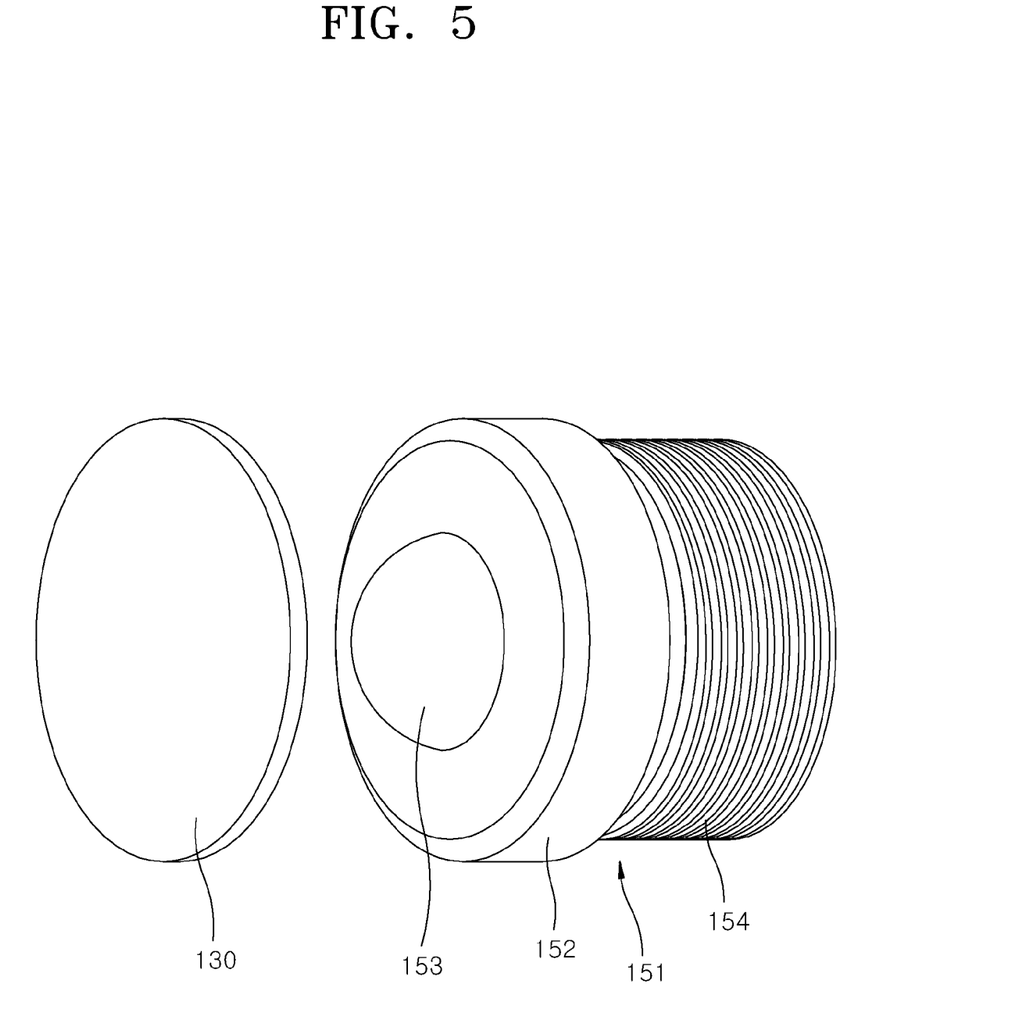
FIG. 5 is an elastic member and a pusher according to an embodiment.
Figure 6:
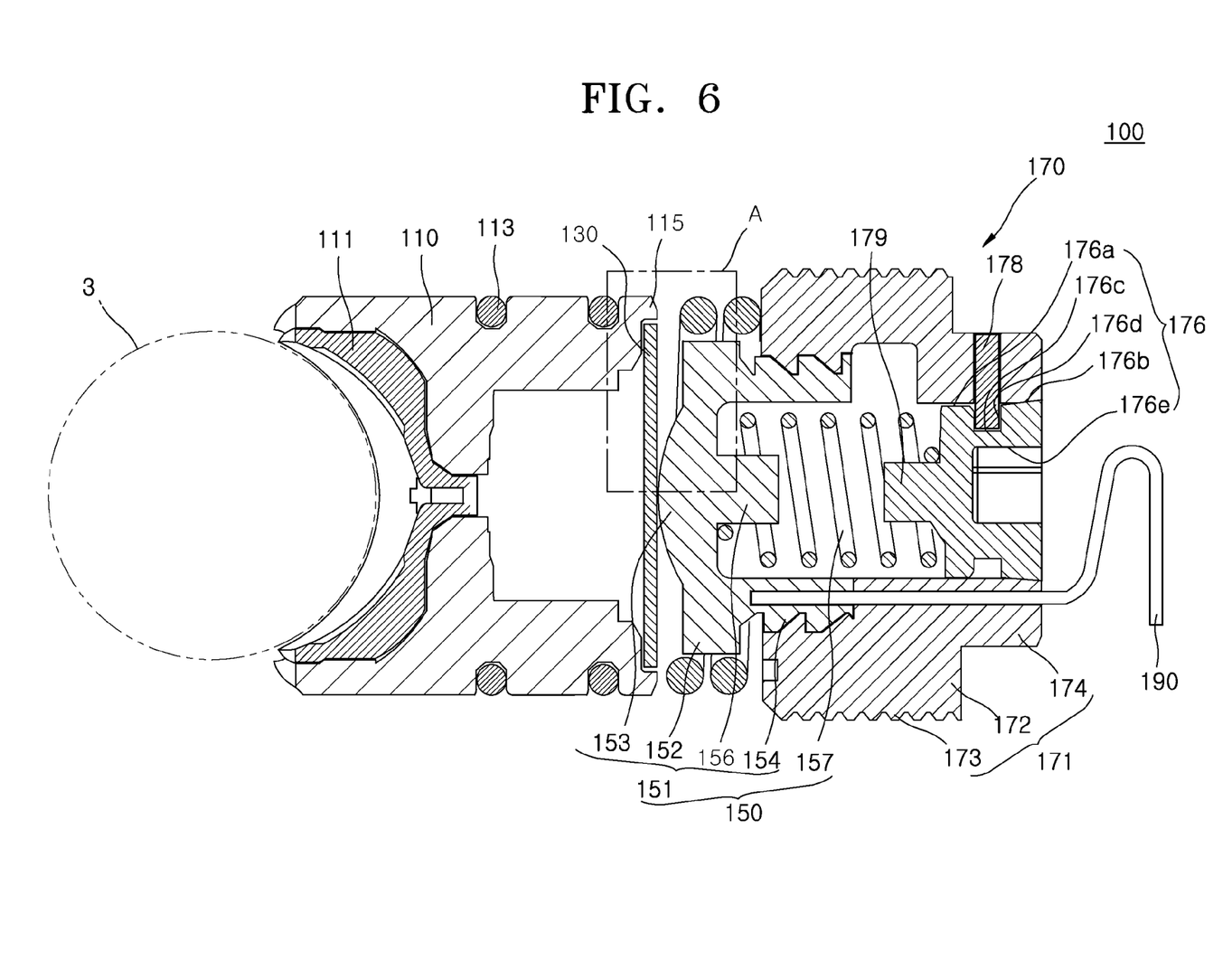
FIG. 6 is a cross sectional view of a yoke clearance compensator according to an embodiment.
Figure 7:
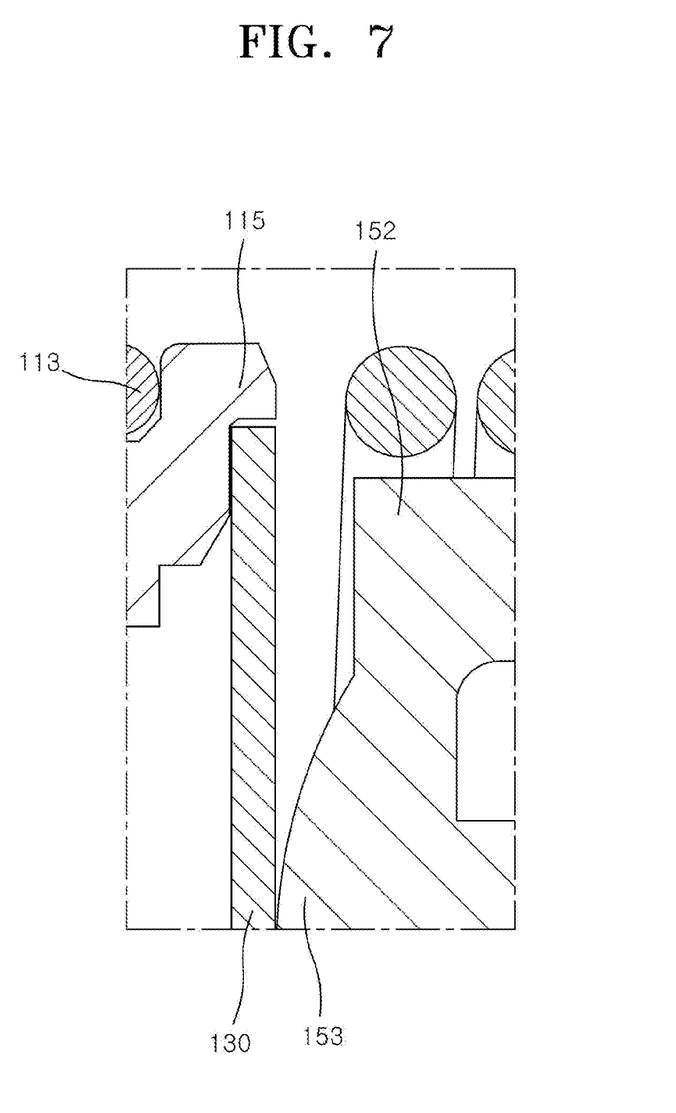
FIG. 7 shows 'A' portion of FIG. 6.
Figure 8:
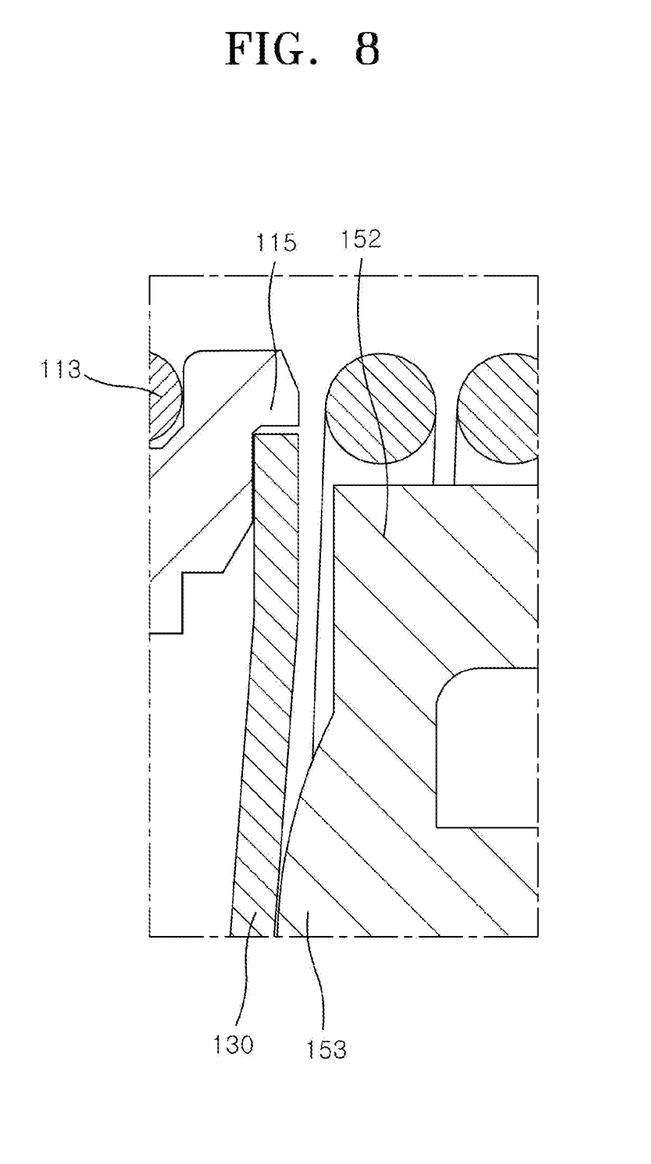
FIG. 8 shows that a pusher is moved toward the elastic member.

FIG. 5 is an elastic member and a pusher according to an embodiment, FIG. 6 is a cross sectional view of a yoke clearance compensator according to an embodiment, FIG. 7 shows 'A' portion of FIG. 6, and FIG. 8 shows that a pusher is moved toward the elastic member.

Referring to FIGS. 5 to 8, the elastic member 130 is located in the direction of the other side (right side in FIG. 4) of the yoke body 110. The elastic member contacts the press portion 150 and presses the yoke body 110 toward rack bar 3 at the same time.

In this embodiment, the elastic member 130 is a plate spring, inserted inside of the yoke body 110, the substantially central portion contacts and supports the press portion 150 thereby pressing the yoke body 110 elastically.

An elastic member fastening projection 115 is protruded on the surface of the yoke body 110 in the side of yoke plug portion 170 according the outside circumference surface. The elastic member fastening projection 115 surrounds the elastic member 130 and prevents the elastic member 130 from being eccentric.

A press portion 150 contacts with the elastic member 130 and elastically supports the elastic member 130. In this embodiment, the press portion 150 includes a pusher 151 and a rotatable elastic portion 157.

The pusher 151 is rotatably coupled to the yoke plug 171, is formed convex toward the elastic member 130, and contacts the elastic member 130 and supports the elastic member 130. In this embodiment, the pusher 151 is screwed and coupled with the yoke plug 171 and presses the elastic member 130 toward the yoke body 110.

In this embodiment, the pusher 151 includes a pusher plate 152, a pusher projection portion 153 and a pusher fixing portion 154.

The pusher plate 152 is a shape of a disk and the elastic member 130 is settled on the one side (left side in FIG. 4).

The pusher projection portion 153 is protruded toward the left side (in FIG. 4) of the pusher plate 152, and contacts with the elastic member 130. In this embodiment, the surface of the pusher projection portion 153 contacting with the elastic member 130 is curved, and the damage and the noise due to the contact with the elastic member 130 are prevented and the friction with the elastic member 130 is reduced during rotation.

The pusher fixing portion 154 is protruded on the right side (in FIG. 4) of the pusher plate 152, and the screw threads are formed on the outer circumference surface so that the pusher fixing portion 154 is rotatably coupled to the yoke plug 171.

Both ends of a rotatable elastic portion 157 are fixed with a rotatable elastic pusher fixing portion 156 of the pusher 151 and the yoke plug portion 170, respectively, to support the pusher 151 rotatably and elastically. In this embodiment, the rotatable elastic portion 157 is a torsion spring.

Figure 9:
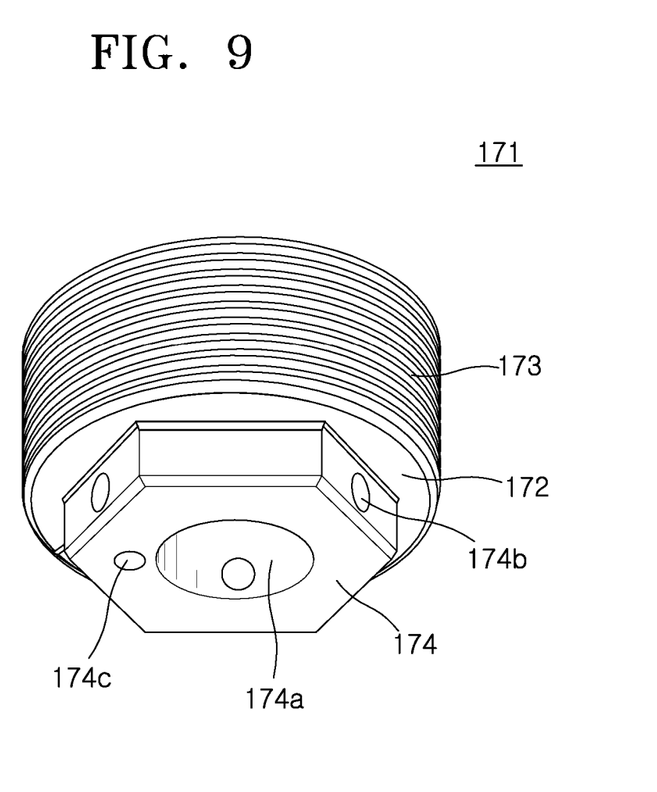
FIG. 9 shows a yoke plug in a yoke clearance compensator according to an embodiment.
Figure 10A:
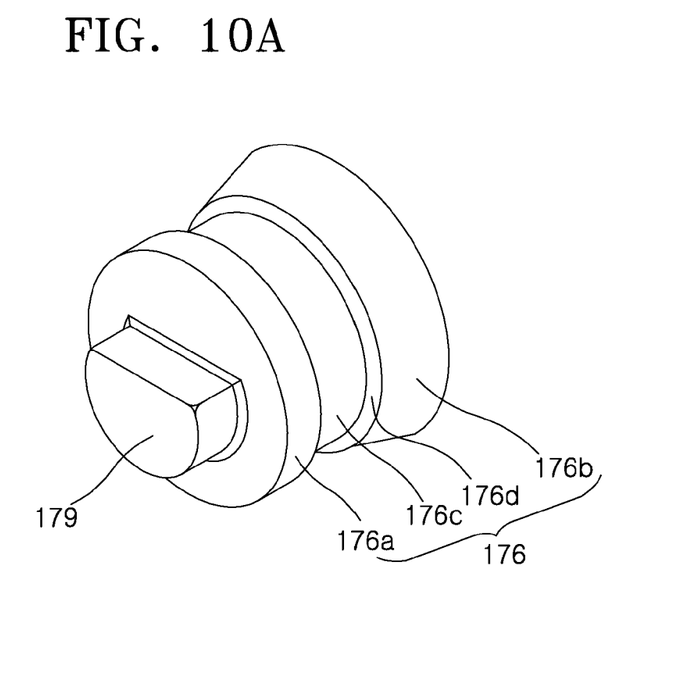
FIGS. 10A and 10B are perspective views showing a body of adjustment portion and a rotational elastic fixing portion according to an embodiment.
Figure 10B:
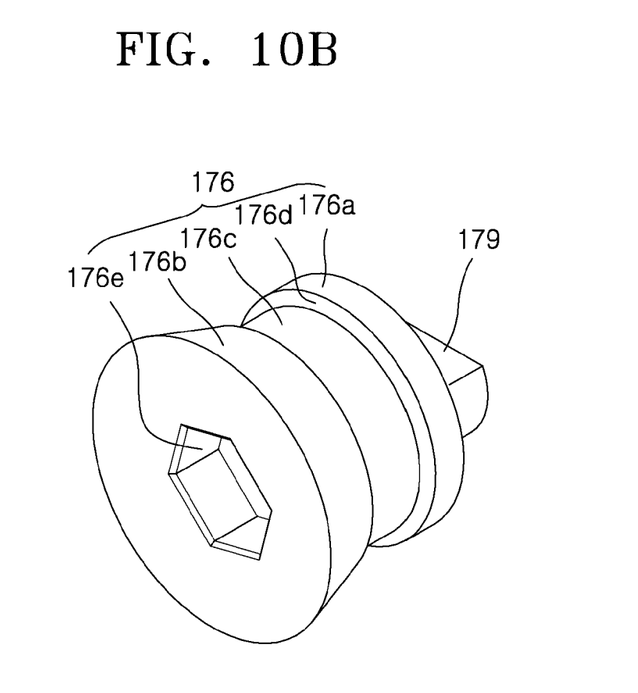
Figure 11:
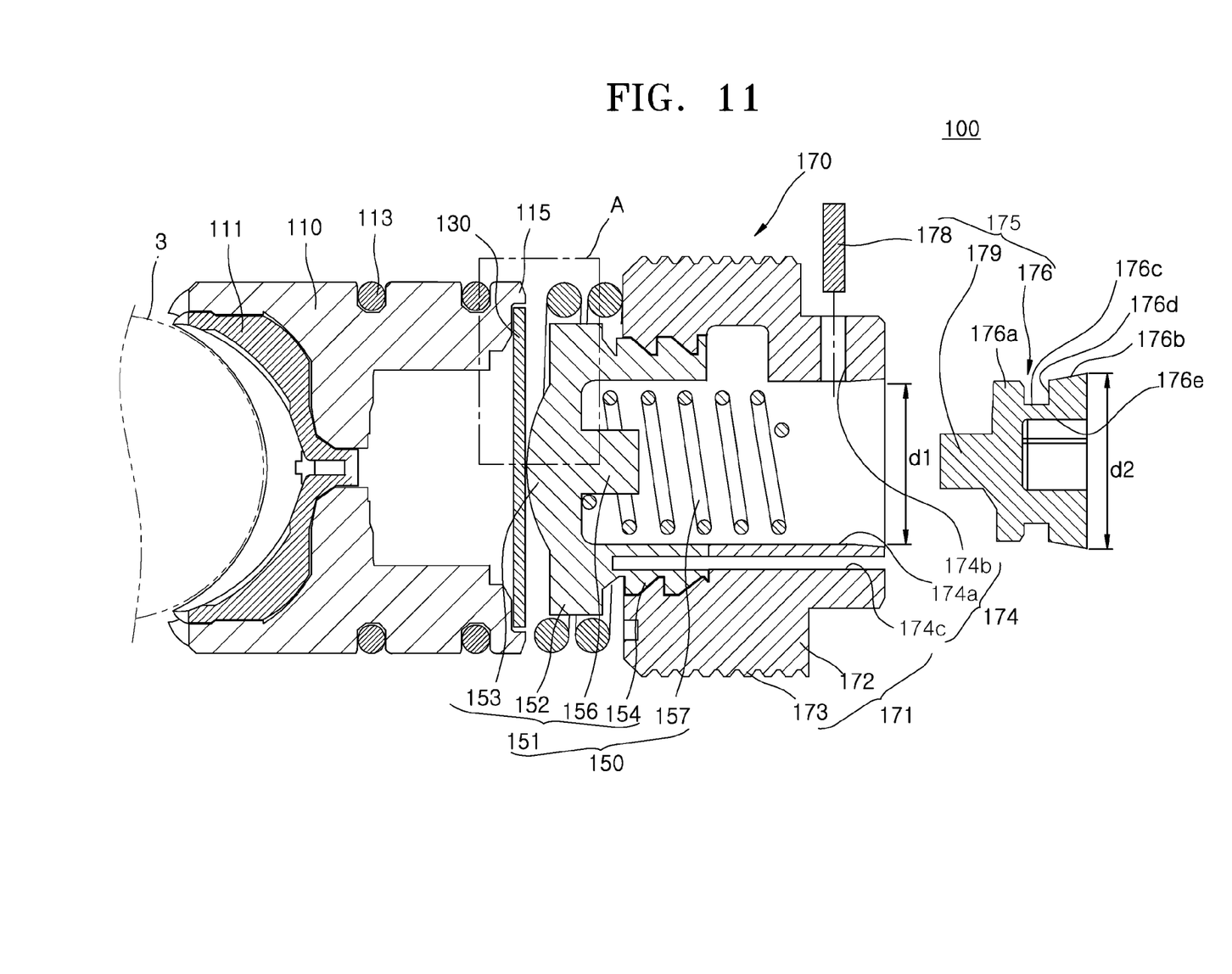
FIG. 11 shows a adjustment body portion and a body fixing portion prior to the assembly in a yoke clearance compensator according to an embodiment.

FIG. 9 shows a yoke plug in a yoke clearance compensator according to an embodiment. FIGS. 10A and 10B are perspective views showing a body of adjustment portion and a rotational elastic fixing portion according to an embodiment. FIG. 11 shows an adjustment body portion and a body fixing portion prior to the assembly in a yoke clearance compensator according to an embodiment.

Referring to FIGS. 9 to 11, the yoke plug portion 170 is fixed to the housing 2, and adjusts the level of supporting the elastic member 130 elastically by the press portion 150. In this embodiment, the yoke plug portion 170 includes a yoke plug 171 and a press adjustment portion 175.

The yoke plug 171 is fixed to the housing 2 and a press adjustment portion 175 is inserted to the inside thereof.

In this embodiment, the yoke plug 171 includes a yoke plug body 172, a yoke plug fixing portion 173 and a yoke plug projection portion 174.

The yoke plug body 172 forms the outer shape of the yoke plug 171, and is inserted to the housing 2.

The yoke plug fixing portion 173 is formed on the outer circumference surface of the yoke plug body 172 as the shape of screw threads, and fixes the yoke plug body 172 to the housing 2.

The yoke plug projection portion 174 is protruded toward the rear side (right side in FIG. 11) of the yoke plug body 172, and a body fixing portion 178 and others are inserted therein.

In this embodiment, the cross section of the yoke plug projection portion 174 is a shape of a polygonal, and the yoke plug body 172 is easily coupled to the housing 2 by using a tool such as a wrench.

In this embodiment, the yoke plug projection portion 174 includes an adjustment entering hole portion 174a, a body fixing entering hole portion 174b, and a fixing entering hole portion 174c.

The adjustment entering hole portion 174a is a hole formed by penetrating the yoke plug body 172 in the left to right direction (in FIG. 11) so that the press adjustment portion 175 can be inserted therein.

The body fixing entering hole portion 174b is a shape of a hole formed on the yoke plug projection portion 174 from the outside of the yoke plug projection portion 174 to the direction of the rotational central axis of the yoke plug body 172. A body fixing portion 178 is entered through this hole portion, and the body fixing portion 178 presses and fixes the adjustment body portion 176 which is entered to the adjustment entering hole portion 174a.

A plurality of body fixing entering hole portions 174b are provided according to the outer side of the yoke plug projection portion 174, and a plurality of body fixing portions 178 can be installed to press and support the adjustment body portion 176, and therefore the adjustment body portion 176 can be firmly fixed.

The fixing entering hole portion 174c is a hole through which a fixing portion 190 is entered. The fixing portion 190 prevents the pusher 151 from being rotated by the rotatable elastic portion 157 when a yoke clearance compensator 100 is inserted to the housing 2.

The press adjustment portion 175 adjusts the strength of supporting the elastic member 130 by the press portion 150, and is engaged to the adjustment entering hole portion 174a by fitting. In this embodiment, the press adjustment portion 175 includes a adjustment body portion 176 and a rotatable elastic fixing portion 179.

The adjustment body portion 176 is engaged to the adjustment entering hole portion 174a by fitting. In this embodiment, the adjustment body portion 176 includes a body of adjustment portion 176a and a fitting engagement coupling portion 176b.

The body of adjustment portion 176a is rotatably inserted to the adjustment entering hole portion 174a and a shape of a cylinder. When the body of adjustment portion 176a is inserted to the adjustment entering hole portion 174a and rotated, a rotatable elastic fixing portion 179 is rotated, and accordingly the rotatable elastic portion 157 is rotated so that the elastic force pressing the pusher 151 toward the rack bar 3 is changed.

A fitting engagement portion 176b is located in the rear (right direction in FIG. 11) of the body of adjustment portion 176a. The diameter of the fitting engagement portion 176b is decreased toward the rack bar 3 to be engaged to the adjustment entering hole portion 174a by fitting.

In this embodiment, the diameter $d_2$ of the rear end (right end in FIG. 11) of the fitting engagement portion 176b is larger than the diameter $d_1$ of the adjustment entering hole portion 174a. If the fitting engagement portion 176b is pressed and fitted to the adjustment entering hole portion 174a, the shape of the fitting engagement portion 176b is transformed to be engaged to the adjustment entering hole portion 174a by fitting.

In this embodiment, the press adjustment portion 175 further includes a body fixing portion 178. The body fixing portion 178 fixes the adjustment body portion 176 to the yoke plug 171 to prevent the adjustment body portion 176 from being detached from the yoke plug 171.

In this embodiment, the body fixing portion 178 enters into the body fixing entering hole portion 174b and presses the adjustment body portion 176, thereby fixing the adjustment body portion 176 to the yoke plug 171. The body fixing portion 178 includes a metal material, and is a shape of a pin.

The body fixing portion 178 includes a metal material, and is prevented from being damaged by the pressure which is generated when the adjustment body portion 176 is pressed and supported.

If the body fixing portion 178 is a shape of a pin, it is easy to insert through the body fixing entering hole portion 174b, and it can be easily assembled by fitting to the body fixing entering hole portion 174b without using a tool such as a driver.

A body fixing settlement portion 176c is formed on the side of the adjustment body portion 176 as a concaved shape so that the body fixing portion 178 may settle, for preventing the adjustment body portion 176 from being slipped from the body fixing portion 178 when the body fixing portion 178 presses the adjustment body portion 176.

The body fixing settlement portion 176c is formed as a concaved shape between the body of adjustment portion 176a and the fitting engagement portion 176b, and an end portion of the body fixing portion 178 is settled. A body fixing fastening portion 176d is formed as a shape of a step among the body fixing settlement portion 176c, the body of adjustment portion 176a and the fitting engagement portion 176b because the body fixing settlement portion 176c is formed as a concaved shape between the body of adjustment portion 176a and the fitting engagement portion 176b.

Accordingly, when the body fixing portion 178 contacts the body fixing settlement portion 176c and presses the adjustment body portion 176, the end of the body fixing portion 178 is fastened to the body fixing fastening portion 176d, and therefore the movement of the adjustment body portion 176 is prevented.

A rotatable elastic fixing portion 179 is protruded from the adjustment body portion 176 toward the rack bar 3, and the rotatable elastic portion 157 is fixed. In this embodiment, the rotatable elastic fixing portion 179 is integral to the adjustment body portion 176. The rotatable elastic portion 157 is engaged to the outside of the rotatable elastic fixing portion 179 by fitting. The rotatable elastic fixing portion 179 is rotated together with the rotatable elastic portion 157 due to the rotation of the adjustment body portion 176, thereby adjusting the rotation elasticity of the rotatable elastic portion 157.

In this embodiment, the yoke clearance compensator 100 further includes a fixing portion 190.

The fixing portion 190 penetrates the yoke plug 171 and is settled on the pusher 151, thereby maintaining the screw coupling between the pusher 151 and the yoke plug 171. If the press portion 150 is assembled to the housing 2 with being assembled to the yoke plug 171, the pusher 151 receives a rotation force by the rotatable elastic portion 157 and the screw coupling between the pusher 151 and the yoke plug 171 may be loosened.

In this case, the front end portion (left end in FIG. 4) of the fixing portion 190 is settled on the pusher 151 through the fixing entering hole portion 174c, and therefore it is prevented that the screw coupling between the pusher 151 and the yoke plug 171 is loosened.

The rear end portion (right end in FIG. 4) of the fixing portion 190 is protruded to the outside of the yoke plug 171 when the front end portion is settled on the pusher 151. Accordingly, an operator can easily remove the fixing portion 190 after the yoke clearance compensator 100 is assembled to the steering gear box 1.

Hereinafter, the principle of the operation of the yoke clearance compensator 100 according to an embodiment is explained.

Referring to FIGS. 1, 4, 6 and 11, the yoke body 110, which is elastically supported by the elastic member 130 in the yoke clearance compensator 100, is pressed to the left side (in FIG. 1) of the rack bar 3.

When gears between the rack bar 3 and the pinion 4 are worn out according to the operation of a vehicle, the rack bar 3 is moved to the left (in FIG. 1) from the initial position due to the abrasion of the gear and others. The yoke body 110 is elastically supported by the elastic member 130, and it is also moved to the left corresponding to the movement to the left of the rack bar 3. That is, the clearance according to the movement of the rack bar 3 is compensated by the corresponding movement of the yoke body 110 by the elastic member 130.

The pusher 151 receives a rotational elastic force by the rotatable elastic portion 157. Accordingly, when the yoke body 110 moves to the left (in FIG. 6), the pusher 151 moves to the left because the screw coupling with the yoke plug 171 is loosened by the rotatable elastic portion 157. That is, according to the movement of the pusher 151 to the left, the elastic member 130 supported by the pusher 151 moves to the left as well, and therefore the elastic member 130 can still support the yoke body 110.

The press adjustment portion 175 is utilized to adjust the level of pressing the rack bar 3 by the yoke body 110 when the yoke clearance compensator 100 is assembled.

The body fixing portion 178 which fixes the adjustment body portion 176 to the yoke plug 171 is detached, and a tool inserting groove portion 176e formed on the rear end surface (right side in FIG. 11) of the adjustment body portion 176 is rotated by a hexagonal wrench or others, then the rotatable elastic fixing portion 179 is rotated together with the adjustment body portion 176, and accordingly the rotatable elastic portion 157 fixed to the rotatable elastic fixing portion 179 is rotated so that the level of pressing the elastic member 130 or the yoke body 110 through the pusher 151 can be adjusted.

When the adjustment by the rotation of the rotatable elastic portion 157 is completed, the adjustment body portion 176 is pressed toward the rack bar 3 and is entered to the adjustment entering hole portion 174a by pressing. After the adjustment body portion 176 is entered by pressing, the body fixing portion 178 is entered to the body fixing entering hole portion 174b and the end portion of the body fixing portion 178 presses the body fixing settlement portion 176c thereby preventing the adjustment body portion 176 from being detached from the yoke plug 171.

While various embodiments have been described above, it will be understood to those skilled in the art that the embodiments described are by way of example only. Accordingly, the device described herein should not be limited based on the described embodiments.

What is claimed is:

1. A yoke clearance compensator comprising:
   a yoke body having a cavity and configured to support a rack bar;
   a plate spring comprising a first main surface and a second main surface; and
   a pusher assembly comprising a pusher, a yoke plug and a torsion spring placed inside a bore of the yoke plug, wherein the torsion spring is connected to the pusher and configured to cause the pusher to rotate about an axis relative to the yoke plug, wherein the pusher is engaged with the yoke plug such that the pusher moves along the axis relative to the yoke plug as it rotates about the axis, the pusher comprising a convex portion,
   wherein the yoke body, the plate spring and the pusher assembly are arranged in order along the axis such:
      that the plate spring is interposed between the yoke body and the pusher assembly,
      that the cavity of the yoke body, a central portion of the plate spring and the convex portion of the pusher are aligned along the axis,
      that the first main surface of the plate spring faces the yoke body,
      that a perimeter of the plate spring on the first main surface abuts the yoke body,
      that the second main surface of the plate spring contacts the convex portion of the pusher,
   wherein the yoke clearance compensator is configured such that the torsion spring causes the pusher to rotate about the axis relative to the yoke plug and to move toward the yoke body along the axis, which causes the convex portion of the pusher to push the central portion of the plate spring such that the central portion of the plate spring is depressed toward the cavity of the yoke body and the perimeter of the plate spring exerts force to the yoke body along the axis for the yoke body to transmit the force to the rack bar.

2. The compensator of claim 1, wherein the yoke body comprises a recessed portion which is configured to receive the plate spring.

3. The compensator of claim 1, wherein the pusher comprises male threads, wherein the yoke plug comprises female threads which are configured to engage with the male threads such that the pusher is rotatably coupled to the yoke plug by engagement of the male and female threads.

4. The compensator of claim 1, further comprising a torsion adjustment member rotatably coupled to the yoke plug,
- wherein the torsion spring is interposed between the pusher and the torsion adjustment member,
- wherein one end of the torsion spring is connected to the torsion adjustment member and the torsion adjust member is rotatably engaged with the yoke plug such that rotation of the torsion adjustment member relative to the yoke plug causes torsion of the torsion spring to change.

5. The compensator of claim 4, wherein the plug yoke comprises a hole which comprises a tapered wall portion, and wherein the torsion adjustment member comprises a tapered body portion configured to fit the tapered wall portion.

6. The compensator of claim 4 further comprising a body fixing member configured to fix the torsion adjustment member to the yoke plug for preventing the torsion adjustment member from rotating relative to the yoke plug.

7. The compensator of claim 6, wherein the body fixing member is inserted into a hole of the yoke plug and configured to push the torsion adjustment member to the yoke plug.

8. The compensator of claim 7, wherein the body fixing member includes a metal material and is a shape of a pin.

9. The compensator of claim 1, further comprising a fixing member comprising a bar extending through a hole of the yoke plug and a hole of the pusher such that the fixing member inhibits the pusher from rotating relative to the yoke plug.

10. The compensator of claim 9, wherein the bar of the fixing member further extends toward outside the yoke plug.

\* \* \* \* \*